(12) United States Patent
Pike et al.

(10) Patent No.: US 8,580,014 B1
(45) Date of Patent: Nov. 12, 2013

(54) METHOD UTILIZING INTERNATIONAL ORGANIZATION FOR STANDARDIZATION CONTAINER FILTER HOUSE

(71) Applicant: General Electric Company, Schenectady, NY (US)

(72) Inventors: Anthony Richard Pike, Southampton (GB); Alun Gareth Williams, Southampton (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/932,143

(22) Filed: Jul. 1, 2013

Related U.S. Application Data

(62) Division of application No. 12/780,160, filed on May 14, 2010, now Pat. No. 8,500,838.

(51) Int. Cl.
*B01D 46/00* (2006.01)
(52) U.S. Cl.
USPC ............... 95/273; 95/286; 55/482; 55/484; 55/385.1
(58) Field of Classification Search
USPC ......... 55/385.1, 385.4, 482, 484; 95/273, 286
See application file for complete search history.

(56) References Cited

U.S. PATENT DOCUMENTS

| | | | |
|---|---|---|---|
| 4,562,791 A | 1/1986 | Porter et al. | |
| 5,223,008 A | 6/1993 | Troxell | |
| 6,688,048 B2 | 2/2004 | Staschik | |
| 6,983,567 B2 | 1/2006 | Ciotti | |
| 7,511,960 B2 | 3/2009 | Hillis et al. | |
| 7,852,627 B2 | 12/2010 | Schmitt | |
| 7,998,253 B2 | 8/2011 | Gregg | |
| 8,046,896 B2 | 11/2011 | Schmitt et al. | |
| 2005/0184000 A1 | 8/2005 | Jowett | |
| 2005/0218075 A1 | 10/2005 | Graetz et al. | |
| 2005/0274669 A1 | 12/2005 | Marchesseault et al. | |
| 2007/0187317 A1 | 8/2007 | Graetz et al. | |
| 2009/0301123 A1 | 12/2009 | Monk et al. | |
| 2010/0112925 A1 | 5/2010 | Schmitt et al. | |
| 2011/0056651 A1 | 3/2011 | Monk et al. | |
| 2011/0197767 A1 | 8/2011 | Seitz | |

FOREIGN PATENT DOCUMENTS

| | | |
|---|---|---|
| AU | 2006100474 A4 | 6/2006 |
| WO | 2007120684 A2 | 10/2007 |
| WO | 2010051019 A1 | 5/2010 |

OTHER PUBLICATIONS

British Search Report issued in regards to GB application No. GB1107874.8, Aug. 19, 2011.

*Primary Examiner* — Robert Clemente
(74) *Attorney, Agent, or Firm* — Cooper Legal Group, LLC

(57) ABSTRACT

A method of using a modular International Organization for Standardization (ISO) filter house for filtering process fluids is provided. The filter house includes a self-contained rectangular cuboid enclosure having the outside dimension of a standard, transportable ISO shipping container. The filter house has apertures for fluid flow inlet and fluid flow outlet, and a filter element for removing impurities from the fluid flow. The method includes creating one standard filter house design to be used in any multiple to meet various flow requirements. The method further includes creating a common fluid connection between the filter houses and process equipment so that the filter houses operate in parallel. A kit of modular components for filtration of a fluid is also provided. The kit includes an external structure of an ISO shipping container, vanes to direct fluid flow, and a filter element. The kit also includes apertures that allow fluid communication between the interior of the shipping container and the exterior of the shipping container.

9 Claims, 5 Drawing Sheets

METHOD UTILIZING INTERNATIONAL ORGANIZATION FOR STANDARDIZATION CONTAINER FILTER HOUSE

CROSS-REFERENCE TO RELATED APPLICATIONS

Benefit is hereby claimed from U.S. patent application Ser. No. 12/780,160, and the entire content thereof is expressly incorporated herein by reference.

BACKGROUND OF THE INVENTION

The present invention relates generally to methods of filtration of intake air for power generation equipment, and more particularly, to a method of using multiples of a standard filtration unit to meet the needs of various power generation units.

Many known gas turbine power generators and diesel-fueled power generators include at least filtration unit that filters air for the intake of the power generation unit. Specifically, at least some known power generation designs utilize unique air filtration devices, each power generation unit with its own air filtration device that is sized specifically to the particular application or particular power generator.

However, when the air filtration units of power generators are designed for specific applications, many inefficiencies may be created. For example, resources could be committed to design of individual air filtration units for specific power generators, storage of multiple units for future need that may not arise, and transport of multiple styles of air filtration units. When the air filtration units arrive at their destination, special moving equipment may be required. As such, it would be useful to have an air filtration method and kit in which the design, measurements, and air flow capacity are standardized and usable in at least one or a multiple in parallel operation for any power generation air intake requirement, thereby increasing the overall efficiency of the design, transportation, and utilization of air filtration equipment for power generation.

BRIEF DESCRIPTION OF THE INVENTION

The following presents a simplified brief description of the invention in order to provide a basic understanding of some example aspects of the invention. This brief description is not an extensive overview of the invention. Moreover, this brief description is not intended to identify critical elements of the invention nor delineate the scope of the invention. The sole purpose of the brief description is to present some concepts of the invention in simplified form as a prelude to the more detailed description that is presented later.

In accordance with one aspect the present invention provides a method for filtration of a fluid using a kit of a plurality of modular components, with each modular component being for filtration of the fluid and with the plurality of modular component operating in parallel. The method includes the following steps: providing each modular component to have an external structure of a standard ISO shipping container, closed on opposite ends and on opposite sides by doors and in which are defined several components for filtration of process fluids; providing each ISO shipping container to define an aperture for a fluid flow inlet; providing a vane bank to direct a fluid flow; providing a filter element; providing each ISO shipping container to define another aperture for a filtered fluid flow outlet from the shipping container; allowing fluid communication through each of the apertures between the interior of the respective shipping container and the exterior of the respective shipping container; providing for each of the modular components to have a filtered fluid flow rating; determining a desired filtered fluid flow requirement, wherein the filter fluid flow requirement is greater than the filtered fluid flow rating of one, singular modular component by utilizing at least a minimum number of modular components as determined by dividing the desired filtered fluid flow requirement proceeding through the modular components in parallel by the fluid flow rating of the modular components; and flowing fluid for filtration using the kit.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
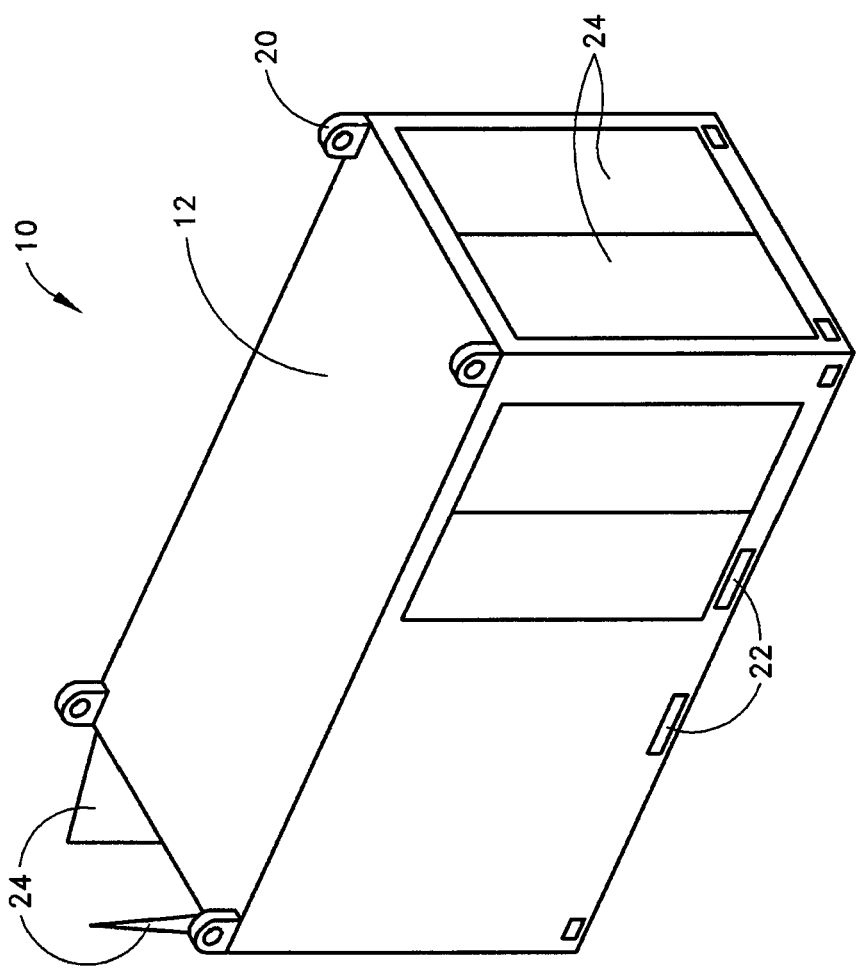
FIG. 1 is a schematic, perspective view of an example modular filter house in accordance with one aspect of the invention.

The following detailed description illustrates a method of using a standardized air filtration apparatus and a kit with components for the same. Example embodiments that incorporate one or more aspects of the present invention are described and illustrated in the drawings. These illustrated examples are not intended to be a limitation on the present invention. The disclosure is described herein as being applied to shown embodiments, namely, use of one or more ISO filter houses for power generation equipment. However, it is contemplated that this disclosure has general application to power generation applications in a broad range of systems and in a variety of applications other than for power generation equipment. Moreover, certain terminology is used herein for convenience only and is not to be taken as a limitation on the present invention.

Turning to the shown example of FIG. 1, an example ISO filter house 10 is shown in accordance with one aspect of the subject invention. The exterior of the ISO filter house is a standardized shipping container 12. The shipping container is one of a number sizes designated by the International Organization for Standardization (ISO). The shipping container 12 may be known by other names, such as "intermodal container" or "intermodal freight shipping container." There are five common standard ISO lengths: 20-ft (6.1 m), 40-ft (12.2 m), 45-ft (13.7 m), 48-ft (14.6 m), and 53-ft (16.2 m). Typical width and height dimensions for the containers are 8 ft wide and 8 feet 6 inches high. However, it is to be appreciated that the current disclosure would encompass other ISO standard length containers. Of course, it is possible to use other dimensions. It is contemplated that other container sizes could be utilized in accordance with an aspect of the present invention. The shipping container has the shape of a rectangular cuboid or rectangular box which has six sides with each side being a rectangle, with each face being effectively perpendicular to the adjacent faces, and with opposed faces being effectively the same size and parallel to each other.

The shipping container 12 includes standard corner castings 20 at each corner of the shipping container. The corner castings 20 interact with the corner castings at the top corners of other shipping containers or standard twist-locks found on transportation and moving equipment for shipping containers. The mating interaction between the corner castings 20 of two shipping containers 12 permits rigid vertical contact between the containers when they are stacked vertically. These corner castings 20 may also be engaged by a transport vehicle (e.g., overhead travel lift) for moving and locating the container. The shipping container 12 may also include other standard elements such as forklift pockets 22 for cooperative use with the forks of a loading and unloading device such as a forklift truck or a sidelifter. This construction method allows the ISO filter house 10 to take advantage of the standardized loading, shipping, connectivity and moving equipment infrastructure that is prevalent in many parts of the world.

The shipping container 12 of the illustrated embodiment can also include a number of closures 24, such as doors, for operator access. For example, one or more closures 24 can be provided so that an operator can enter the interior of the shipping container 12 to operate interior components or to provide maintenance. The closures 24 can take various forms such as dual swinging closures (as shown in FIG. 1), a single swinging door, rolling doors, or any other standard door that is known in the art. The closures 24 can be sealed to help ensure unwanted natural elements remain outside the shipping container 12. The ISO filter house 10 can thus be sealed intact and loaded with relative ease onto container ships, railroad cars, planes, and trucks. Enclosure within a standard (e.g., standard size, standard configuration, etc.) shipping container 12 enables this ISO filter house 10 to be quickly deployed to remote job sites using a conventional transport vehicle, such as by rail or by a typical tractor trailer truck.

It is to be appreciated that the shown example has closures 24 for operator access located on the longitudinal ends of the ISO filter house 10 in an example configuration. It is to be appreciated that the closured may be at a different location on the ISO filter house 10 and/or a different number (i.e., more or less) closures could be provided.

Figure 2:
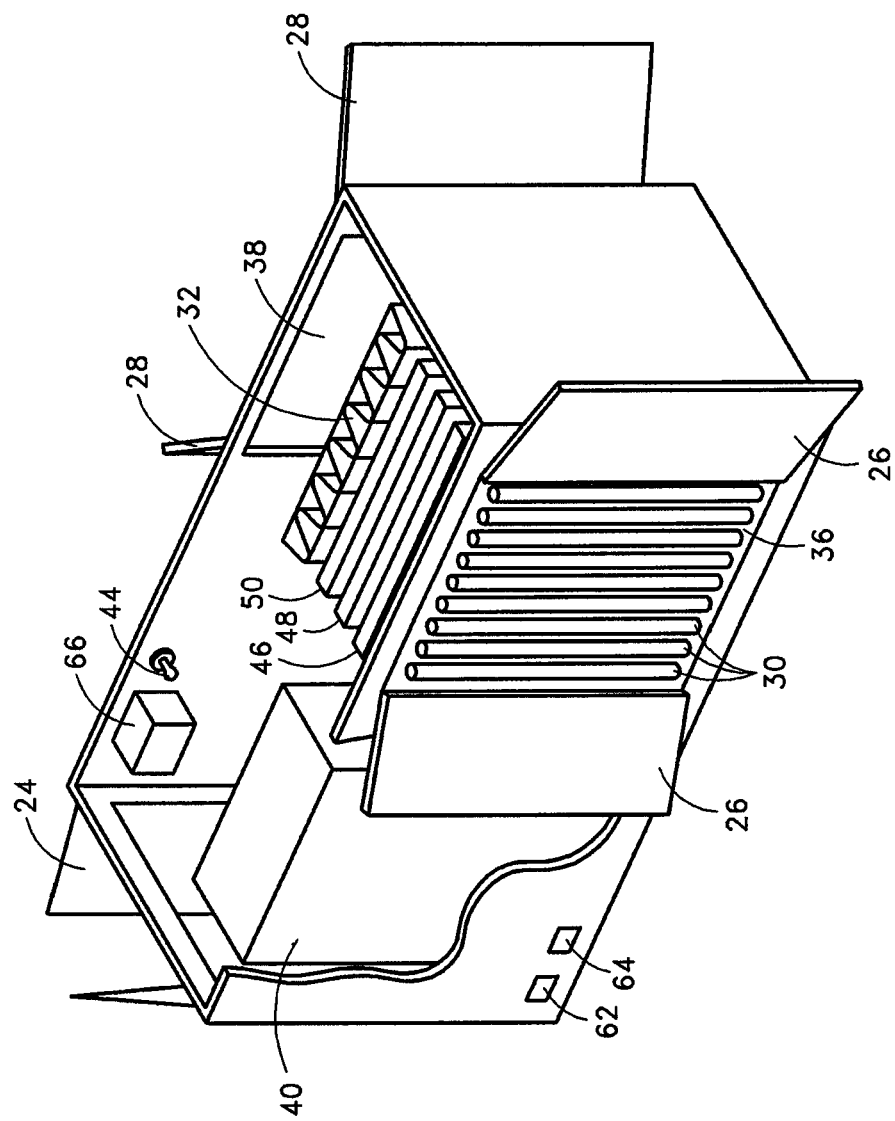
FIG. 2 is view similar to FIG. 1, but with the filter house partially torn open and with closures open to shown some interior components, structures and the like f the presented example.
Figure 3:
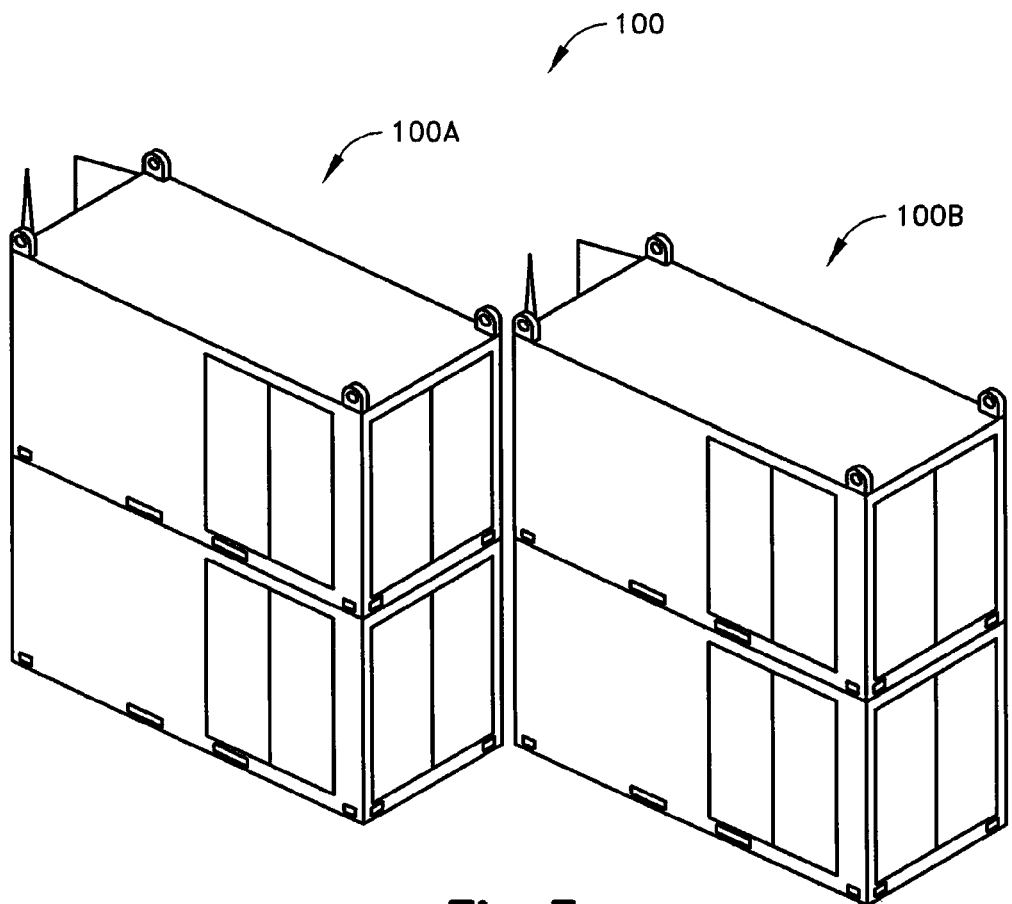
FIG. 3 is schematic, perspective view of plural modular filter houses in accordance with one aspect of the invention.
Figure 4:
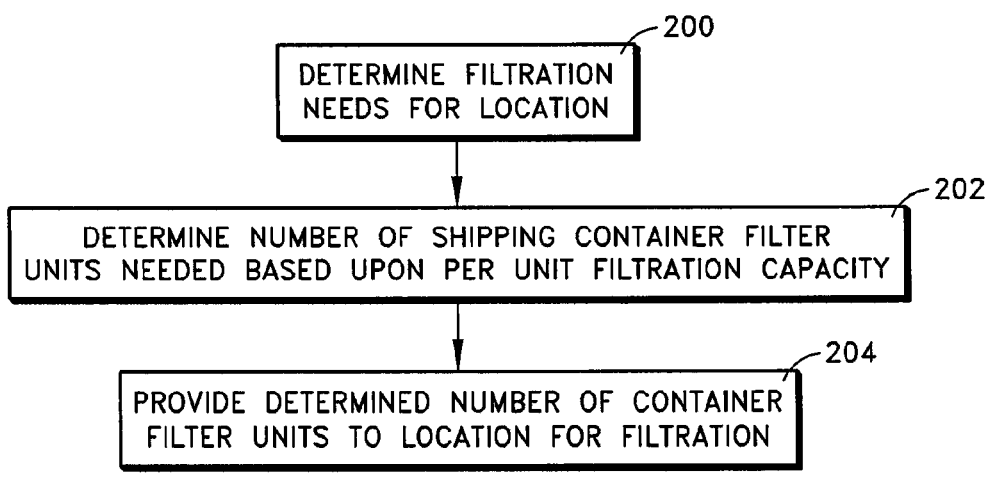
FIG. 4 is a top level flow chart a method in accordance with an aspect of the present invention

Turning to the shown example of FIG. 2, a cut-away view of the shipping container 12 is shown. One wall of the shipping container 12 defines an aperture for a fluid flow inlet 36. The fluid flow inlet 36 allows fluid communication between the interior and exterior of the shipping container 12. The fluid flow inlet 36 is designed to have a shape and size to permit a required fluid flow from the exterior of the shipping container 12 into the interior of the shipping container.

Fluid flow inlet closures 26 can cover the fluid flow inlet 36. The fluid flow inlet closures 26 can take various forms such as dual swinging doors (as shown in FIG. 2), a single swinging door, rolling doors, or any other standard door that is known in the art. The fluid flow inlet closures 26 can be sealed to help ensure unwanted natural elements remain outside the shipping container 12.

Similarly, the shipping container 12 defines an aperture for a fluid flow outlet 38. The fluid flow outlet 38 allows fluid communication between the exterior and interior of the shipping container 12. The fluid flow outlet 38 is designed to have a shape and size to permit a required fluid flow from the interior of the shipping container 12 to the exterior of the shipping container. Fluid flow outlet closures 28 can cover the fluid flow outlet 38. The fluid flow outlet closures 28 can take any of various forms of standard door that are known in the art. The fluid flow outlet closures 28 can be sealed to help ensure unwanted natural elements remain outside the shipping container 12.

The shown example thus has a lateral or side-to-side flow. It is to be appreciated that the shown example with lateral flow is just an example configuration and that different flow configurations are possible. For example, it is to be appreciated that the flow may be longitudinal (i.e., along the major length) through the ISO filter house 10. Closured 24, 26 would be at a different locations on the ISO filter house 10 and/or a different number (i.e., more or less) closures would be provided accordingly.

An optional vane bank consisting of at least one vane 30 is positioned on the interior side of the fluid flow inlet 36. The vanes 30 can direct the flow of a fluid to the interior of the shipping container 12. Additionally, the vanes 30 can promote laminar fluid flow into the interior of the shipping container 12. The vanes 30 can consist of any style of vanes and the vanes can be in any configuration. The shown example provides to be in a vertical configuration and which are closely spaced. Other examples include horizontal configurations, overlapping configurations, etc. The vanes may be movable and/or adjustable. The vanes 30 can have any shape, profile, cross-section, etc. The vanes 30 may be standard vanes currently used for applications such as directing flow. The use of the standard vanes will reduce engineering time and expense. Suitable vanes may be obtained from GENERAL ELECTRIC. One brand name from GENERAL ELECTRIC is ALTAIR.

A filter element 32 is placed downstream of the vanes 30. The filter element 32 can be of microfiber synthetic melt blown surface laminate construction, or of any style of filters that are known in the art. The filter element 32 can be a currently know or even standard filter element. Some examples are products manufactured under the GENERAL ELECTRIC brand. In one embodiment, the filter element 32 provides a minimum of fifteen square meters of filtration area. The use of the standard filter element will reduce engineering time and expense that was previously used to design filtration units for individual power generation units.

The shipping container 12 can include various aspects for operation, control, monitoring and the like, which are generically represented by the box 40. Of course, the shipping container 12 may further include other features such as a lighting fixture 44 to enable maintenance workers to see within the shipping container during low ambient light conditions on the exterior of the shipping container.

The shipping container 12 can still further include various elements to modify the qualities of the fluid flow that passes through the filter process. The ISO filter house 10 provides filtered fluid flow to a power generation unit, and the power generation unit may have minimum requirements for certain qualities of the fluid. For example, a certain temperature of the filtered fluid flow may be desired. The shipping container 12 can include a temperature control unit 46 in order to change the temperature of the filtered fluid flow. The temperature control unit 46 may be in fluid communication with the exterior of the shipping container 12.

The shipping container 12 can also include a humidity control unit 48 in order to change the humidity of the filtered fluid flow. The humidity control unit 48 may be in fluid communication with the exterior of the shipping container 12. The humidity control unit 48 may work in cooperation with a fogger unit 50 which introduces water droplets into the fluid flow. The water droplets evaporate into the filtered fluid flow to increase its humidity.

The ISO filter house 10 can include various interfaces positioned on the shipping container 12 to operatively and releasably connect the ISO filter house 10 to other systems. For example, an electrical connection 62 can be provided on one side of the shipping container 12 for receiving electrical power. The electrical power can be used to operate any electrical systems within the shipping container 12 including the lighting fixture 44, temperature control unit 46, humidity control unit 48 and any automatic controls. As another example, a monitoring connection 64 can be provided on one side of the shipping container for transmitting electrical signals from the interior of the shipping container 12 to an exterior control unit. The electrical signals can originate at monitoring features within the shipping container 12 such as humidity monitors, pressure monitors on either side of the filter element, thermostats, and the like.

In one embodiment, the shipping container 12 can include structure used for unit location or identity purposes. For example, a Global Positioning System (GPS) unit 66 may be included in the shipping container 12. The GPS unit 66 is a device that uses the Global Positioning System to determine the precise location of the ISO filter house 10 to which it is attached and to record the position of the ISO filter house at regular intervals. The recorded location data can be stored within the tracking unit, or it may be transmitted to a central location database, or internet-connected computer, using a cellular, radio, or satellite modem embedded in the unit. This allows the asset's location to be displayed against a map backdrop to locate the ISO filter house and more easily plan global distribution and delivery of the ISO filter houses.

In another embodiment, the shipping container 12 may include Radio Frequency Identification (RFID) technology to create a tamper-evident shipping container. The RFID-enabled device can be embedded in the frame of the shipping container closure 24. Through a wireless network, the device can detect tampering with the shipping container 12. To enhance security, the door hinges can be located inside the shipping container 12 while having only the antenna of the RFID device visible from the outside. This feature allows the owners, transporters, and end users of the ISO filter house to be aware of any possible tampering during storage or shipping.

In one embodiment, the method of using an ISO filter house 10 to provide a required filtered fluid flow is as follows. The method includes creating a standard ISO filter house 10 design. Multiple ISO filter houses 10 are intended to be used for each application where a filtered fluid is needed. The standard ISO filter house 10 will have a fluid flow rating based upon its design parameters. The method further includes determining a desired filtered fluid flow requirement. For example, the fluid flow requirement may be a fluid intake requirement of industrial equipment. The method further includes calculating a minimum required number of ISO filter houses 10 by dividing the desired filtered fluid flow requirement by the fluid flow rating of the ISO filter house to produce a dividend. The method also includes providing a number of ISO filter houses 10 equal to the dividend so that the fluid flow rating of the ISO filter house multiplied by the number of ISO filter houses present is equal to or greater than the desired filtered fluid flow requirement. The method still further includes creating a common fluid flow connection between the ISO filter houses 10 and equipment that has a filtered fluid flow requirement so that the ISO filter houses operate in parallel to meet the desired filtered fluid flow requirement.

The method also includes filtering fluid through the ISO filter houses 10 to meet the filtered fluid flow requirement.

In another embodiment, the method includes an ISO filter house 10 wherein the fluid to be filtered is air, for example, the intake air of industrial equipment that has to be filtered prior to the industrial equipment intake. In another embodiment, the fluid flow requirement is utilized by power generation equipment such as a gas turbine installation.

In another embodiment, the method includes an ISO filter house 10 wherein the filter element 32 provides a minimum of fifteen square meters of filtration area. Because of the very large quantities of air that gas turbines require for operation, airborne contaminants can pose a significant challenge to the condition of rotating equipment. The purpose of the filtration is to protect the turbine components from airborne contaminants that may cause erosion, corrosion, fouling and plugging effects within the gas turbine equipment. Furthermore, the increased area of the filter element can decrease pressure loss across the filter element, helping to increase the efficiency of the downstream power generation equipment.

In another embodiment, the method includes an ISO filter house 10 wherein the ISO filter house further includes equipment to control the humidity of the fluid flow. Humidification provides greater power augmentation, reduces the amount of supplementary air needed to increase the gas turbine total flow, and therefore saves compressor work otherwise needed to pressurize a higher flow.

In yet another embodiment, the method includes an ISO filter house 10 wherein the ISO filter house further includes equipment to control the temperature of the fluid flow. Because efficiency is related to both the inlet and outlet temperatures of the turbine, increasing the air inlet temperature is an obvious way of increasing the efficiency of a gas turbine. Typically, a higher the difference between the two temperatures improves the thermal efficiency of the gas turbine.

In still yet another embodiment, the method includes an ISO filter house 10 wherein the ISO filter house further includes equipment to sense the pressure of the fluid flow on at least one side of the filter element 32. As the ISO filter house 10 relies upon downstream equipment to draw air through the system, a greater decrease in air pressure across the filter increases the workload for the downstream equipment. This pressure drop can be increased by the amount of particulate matter that has been captured by the filter element 32. A large difference between the two pressures can be used to indicate a maintenance need or activate an automated filter element 32 cleaning operation.

In another embodiment, the method includes an ISO filter house 10 wherein the ISO filter house further includes equipment to remove impurities from the filter element 32 which have been removed from the fluid flow. The shipping container 12 can include equipment to initiate reverse pulse cleaning where a pulse of air is forced against the downstream side of the filter element 32, pushing the impurities off the upstream side of the filter element. Alternatively, the equipment may include a vibratory shaking procedure where the filter element 32 moves rapidly to encourage disengagement of the impurities from the filter. The equipment may include other filter cleaning methods as are known in the art.

In another embodiment, the method includes an ISO filter house 10 wherein the ISO filter house further includes equipment to receive and transmit global positioning data. The owner of the ISO filter house 10 can use the global positioning data to track the warehousing, shipping, and location of the ISO filter house regardless of its location on the globe. This data can be used to plan shipping, audit available stock, and track the various locations of the ISO filter houses 10 at work sites.

The ISO filter house 10 may conveniently be packaged in the form of a kit that includes a number of components providing increased convenience, flexibility, and adaptability to operators in the field. For example, a filter element 32 may include one or more individual filters, as well as one or more temperature control units 46, humidity control units 48, or fogger units 50. All of which can be packaged conveniently in an shipping container 12 that is easy to transport with the use of standard handling equipment in many parts of the world.

As an example, a new gas turbine power generation application is considered. The gas turbine may have a filtered fluid flow requirement (in this case air intake) of 33,000 Cubic Feet per Minute (CFM). The ISO filter house 10 standard design eliminates a great amount of engineering time and expense for an air filter unit for the new gas turbine application. The ISO filter house 10 can be brought to the installation site in a quantity that satisfies the filtered air intake needs of the installation.

A supplier may have an inventory of ISO filter houses 10 with a fluid flow rating of 15,000 CFM. The supplier divides the filtered fluid flow requirement of the application by the fluid flow rating of each ISO filter house 10 (33,000 divided by 15,000) yielding a dividend of 2.2. The supplier assigns a whole number of ISO filter houses 10 to the installation equal to or greater than the dividend, which in this case is 3. It is to be appreciated that the presented example of a rating of 15,000 CFM is only one example and is provided to merely illustrate the concept. The actual rating may depend upon many different factors. One factor may be the size of the ISO filter housing utilized within the method/kit because a larger ISO housing size may permit a greater amount of filter media. Also, the type of filter media utilized within the ISO housing, and the type of filter media may be selected dependent upon content/condition of the fluid to be filtered and the content/condition of the particulate to filtered from the fluid. Content/condition may include aspects such as moisture, size, reactiveness, etc.

The supplier then deploys the three ISO filter houses 10 to the designated installation site. Deployment includes releasably attaching the corner castings 20 to transport vehicles and transporting the ISO filter houses 10 to the site. During transport, the various closures 24, 26, 28 should be closed. Upon arrival at the site, the transport vehicles can be uncoupled from the ISO filter houses 10.

Before operating the ISO filter houses 10, the fluid flow outlet 38 of each ISO filter house is connected to the fuel air intake of the equipment that has the filtered fluid flow requirement. The connections allow all the ISO filter houses 10 to operate in parallel fashion. The filtered fluid flow requirement is to be drawn from the ISO filter houses 10 with an approximately equal flow from each.

The filtered fluid flow demand will draw ambient air into the interior portion of the shipping container 12 and into the vanes 30. In order to increase the design savings, the vanes can be standard vane products, such as those manufactured by GENERAL ELECTRIC. One brand name from GENERAL ELECTRIC is ALTAIR. The vanes direct the airflow and promote a laminar flow pattern toward the filter element 32. The filter element 32 removes particulate matter from the ambient air while minimizing the pressure drop from one side of the filter element to the other. Much like the vanes, design time and money can be saved by using standard products for the filter element 32, such as those manufactured by GENERAL ELECTRIC. One brand name from GENERAL ELECTRIC is ALTAIR.

The filter element 32 can be cleaned automatically by use of pulse air. The pulse air method forces air into the filter element 32 from the typically downstream side of the filter element, pushing particulates on the upstream side of the filter element off the filter. Another method of cleaning the filter is via periodic vibration of the filter element 32. The shaking motion releases particulate matter from the filter element 32 so that it can be collected.

During the filtration process, other air quality factors may be improved in order to increase the efficiency of the equipment utilizing the filtered fluid flow. The temperature of the airflow may be changed by the temperature control unit 46 as the air flows through the ISO filter house 10. Additionally, the humidity control unit 48 and the fogger unit 50 may change the humidity of the air flowing through the ISO filter house 10. The filtered fluid flow requirement is then drawn into the downstream equipment, with desired thermodynamic properties to increase the efficiency of the downstream equipment.

Figure 5:
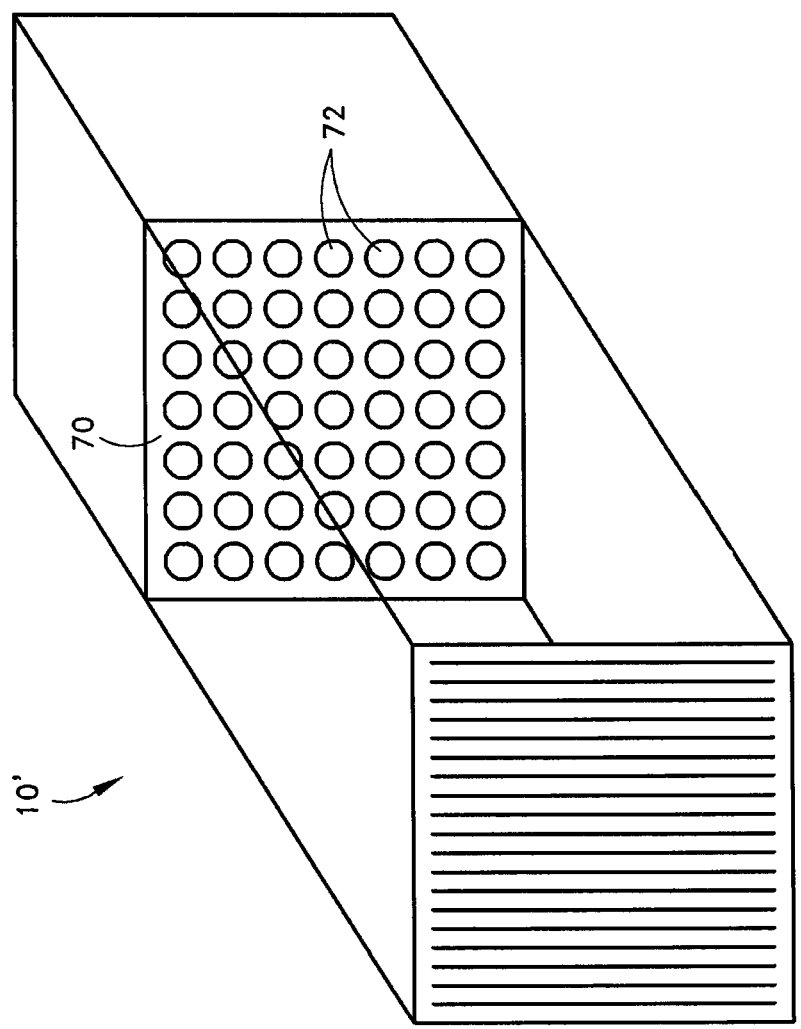
FIG. 5 is a highly schematized, perspective view of another example of a modular filter house in accordance with another aspect of the invention.

It is to be appreciated that the above discussed embodiments are merely examples and that other examples are contemplated. Such other examples could have different constructions, different configurations, different components, etc. For example, FIG. 5 is a highly schematized view of an ISO filter housing 10' that is configured for longitudinal (i.e., along the direction of a major length. The ISO filter housing 10' may have some or all of the same types of components as the previous embodiments. The ISO filter housing 10' may have some different types of components. For example, it is possible to use filter media that may be cleaned while in place and thus include components for cleaning filter media within the filter housing. One specific example would include a tube plate 70 that houses pulse cartridges (not shown) at locations schematically represented by the circles 72 of FIG. 5. Pulse cleaning structures, including pulse cleaning pipes (not shown) could be utilized and located adjacent to the tube plate and cartridges located therein.

Figure 6:
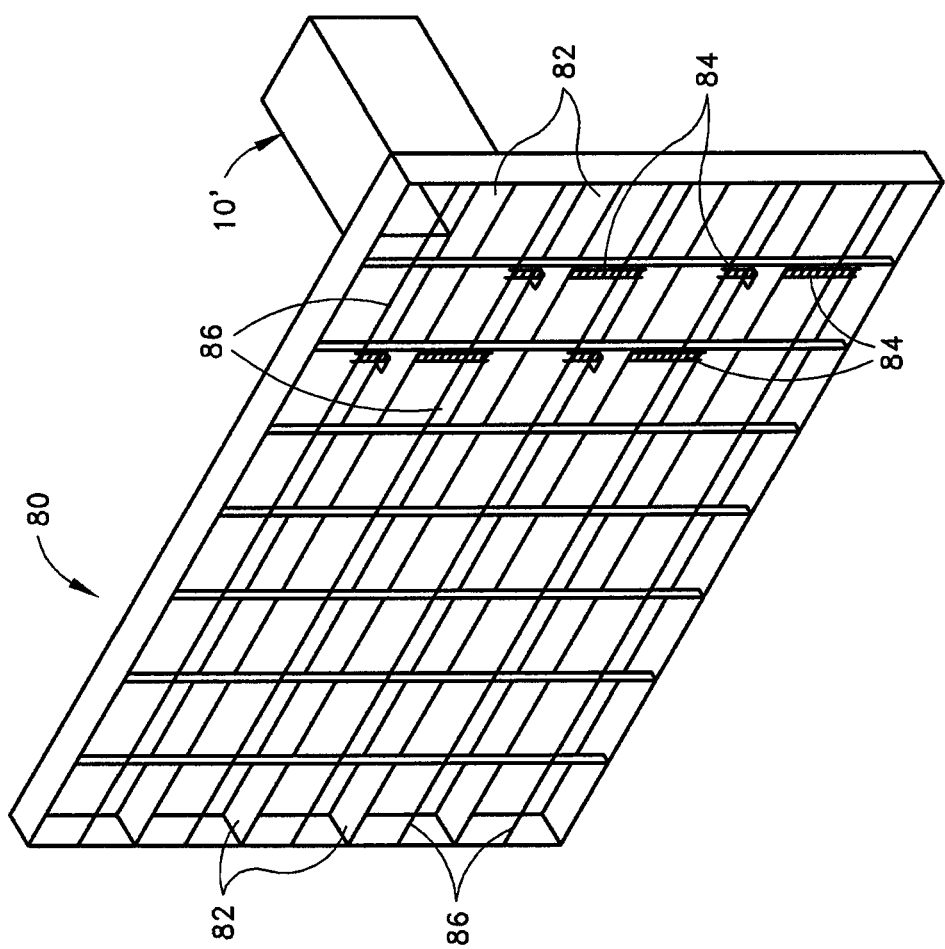
FIG. 6 is a highly schematized, perspective view of an arrangement for use of multiple modular filter houses in accordance with another aspect of the invention.

Still further, multiple e ISO filter housings 10' may be employed in multiples in various configuration (e.g., stacking, arrays) arrangements. Also, various external structures and/or devices could be provided adjacent to such configuration arrangements. FIG. 6 shows one example of such an external structure/device 80 in a highly schematized view. The structure/device 80 could itself be modular and be constructed on-site to match the number ISO filter housings 10' within the array (only one shown, others would be present including located below the shown single filter housing to support the shown single filter housing). The structure/device 80 is basically a series of landings 82 adjacent to the ISO filter housings 10'. Each landing 82 allows a user to be positioned adjacent to a respective ISO filter housings 10' for opening/closing closures to gain entrance into the filter housing or simply work adjacent to the filter housing. The structure/device 80 may have a series of ladders (or stairs) 84, rails 86, and other structures.

This written description uses examples to disclose the invention, including the best mode, and also to enable any person skilled in the art to practice the invention including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for filtration of a fluid using a kit of a plurality of modular components, with each modular component being for filtration of the fluid and with the plurality of modular component operating in parallel, the method including:

providing each modular component to have an external structure of a standard ISO shipping container, closed on opposite ends and on opposite sides by doors and in which are defined several components for filtration of process fluids;

providing each ISO shipping container to define an aperture for a fluid flow inlet;

providing a vane bank to direct a fluid flow;

providing a filter element;

providing each ISO shipping container to define another aperture for a filtered fluid flow outlet from the shipping container;

allowing fluid communication through each of the apertures between the interior of the respective shipping container and the exterior of the respective shipping container;

providing for each of the modular components to have a filtered fluid flow rating;

determining a desired filtered fluid flow requirement, wherein the filter fluid flow requirement is greater than the filtered fluid flow rating of one, singular modular component by utilizing at least a minimum number of modular components as determined by dividing the desired filtered fluid flow requirement proceeding through the modular components in parallel by the fluid flow rating of the modular components; and flowing fluid for filtration using the kit.

2. The method of claim 1, wherein the fluid is air.

3. The method of claim 1, wherein the fluid flow is directed from the fluid flow outlet to power generation equipment.

4. The method of claim 1, wherein the filter element provides a minimum of fifteen square meters of filtration area.

5. The method of claim 1, including providing a humidity control unit to control the humidity of the fluid flow.

6. The method of claim 1, including providing a temperature control unit to control the temperature of the fluid flow.

7. The method of claim 1, including providing a pressure sensor to determine the pressure of the fluid flow on at least one side of the filter element.

8. The method of claim 1, including providing a filter element cleaning device to remove impurities from the filter element which have been removed from the fluid flow.

9. The method of claim 1, including providing equipment to receive and transmit global positioning data.

* * * * *